Dec. 8, 1942.   H. M. LOUDEN ET AL   2,304,736
MOLD LOCK
Filed April 24, 1941   4 Sheets-Sheet 1
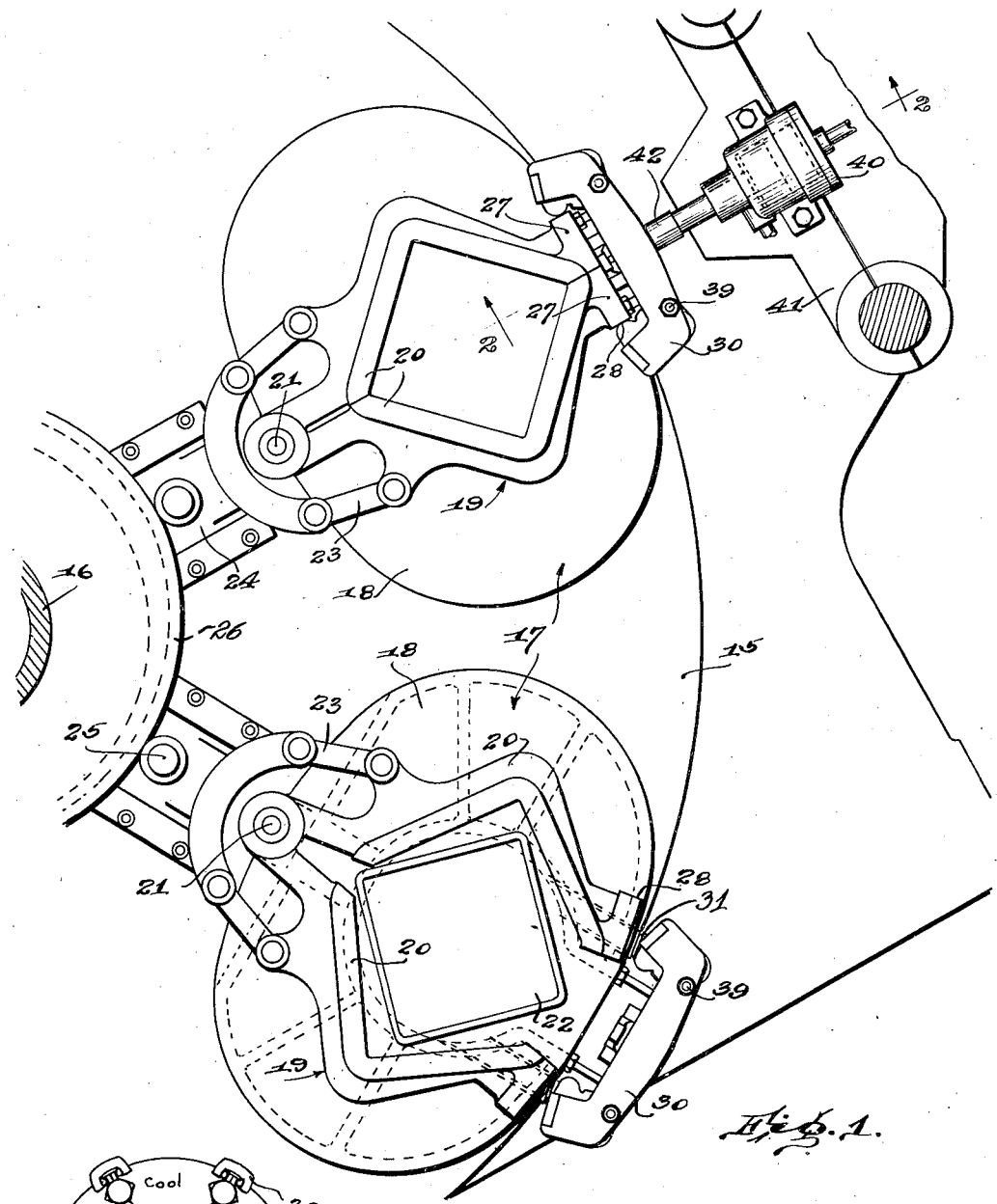
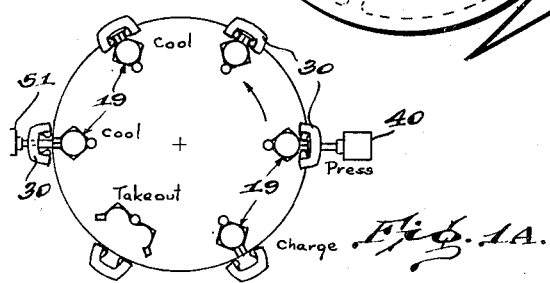
H. M. Louden
C. W. M°Creery
INVENTORS
BY Rule & Hoge
ATTORNEYS

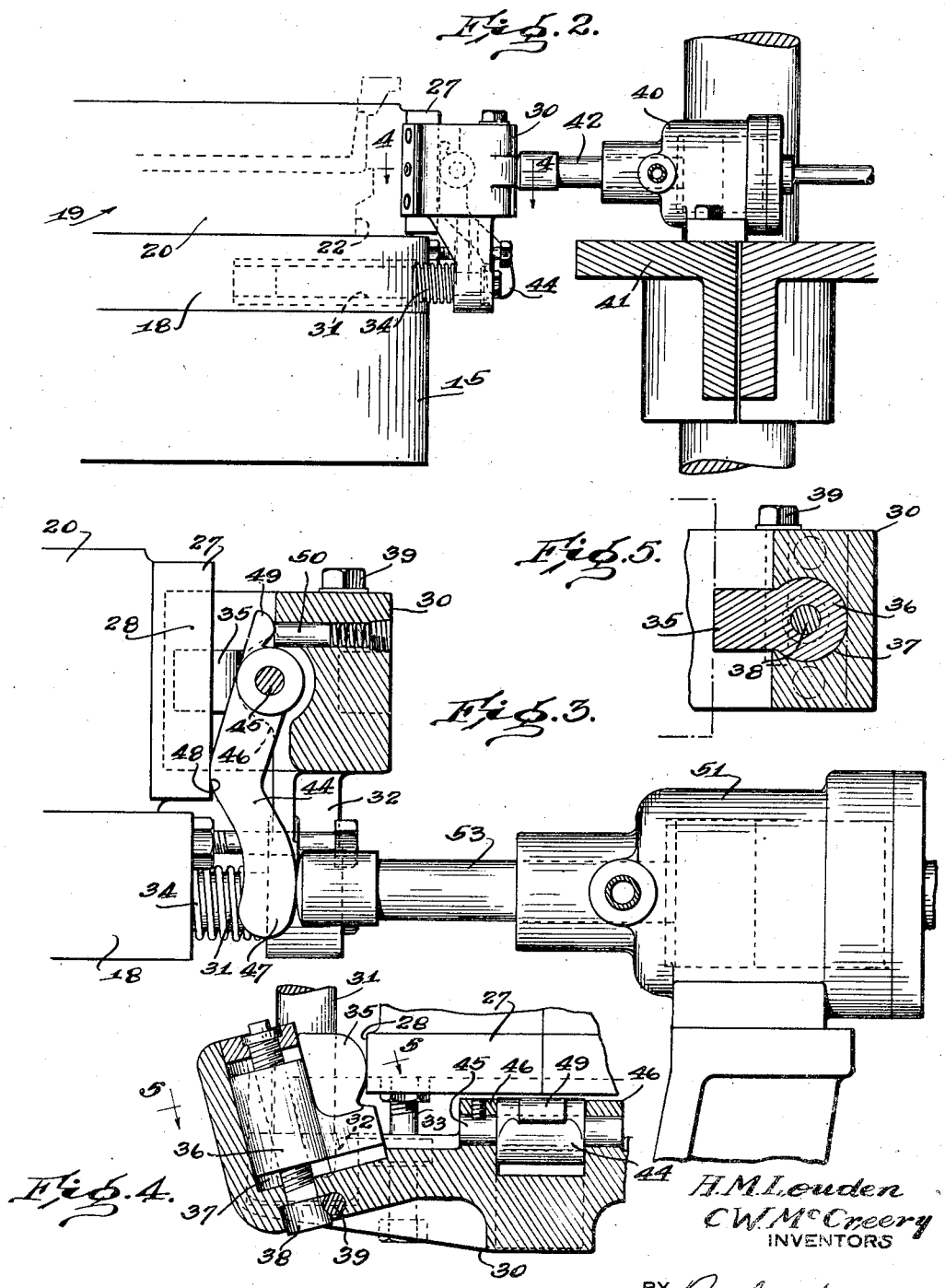

Dec. 8, 1942.       H. M. LOUDEN ET AL       2,304,736
                       MOLD LOCK
              Filed April 24, 1941        4 Sheets-Sheet 3
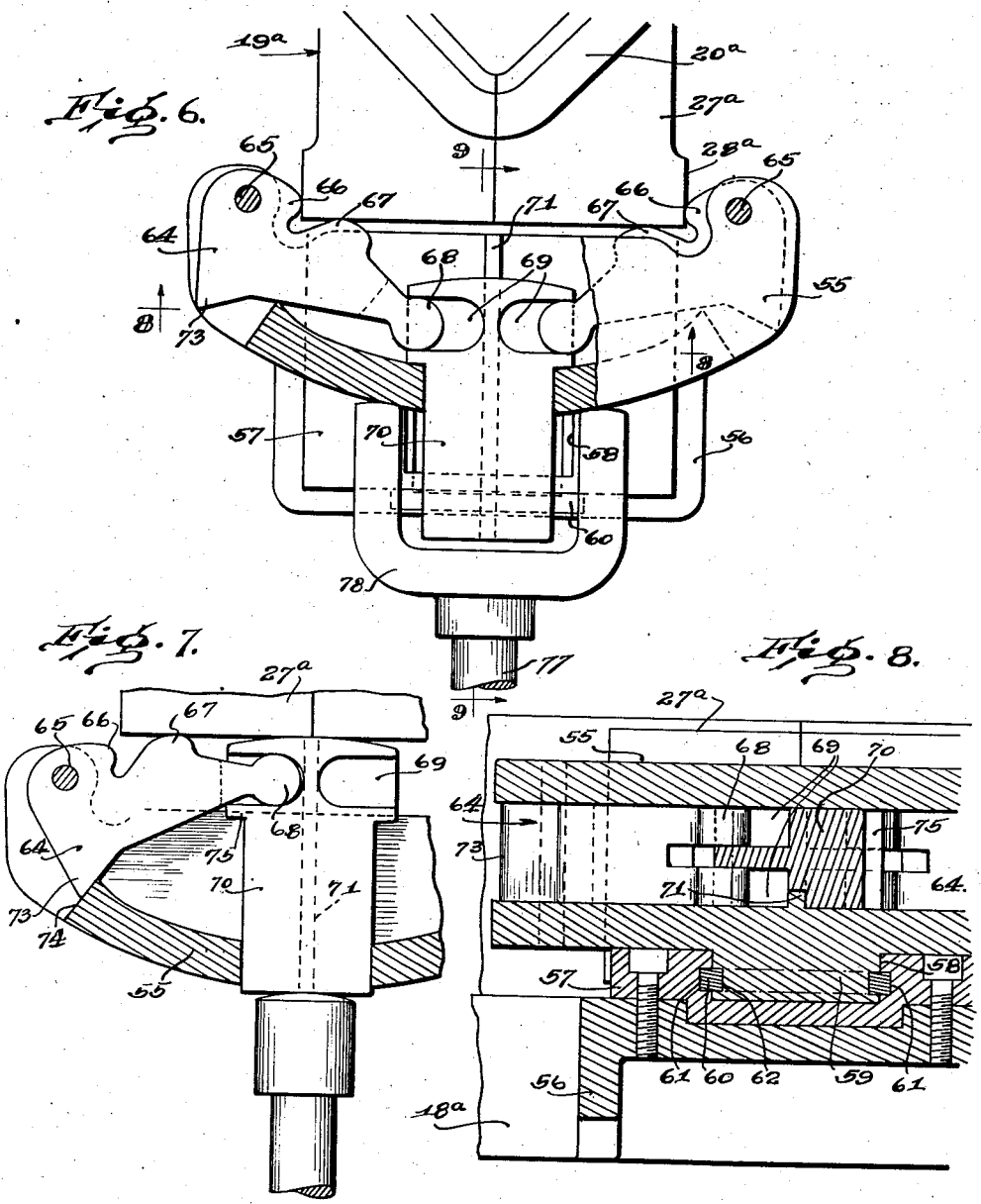
H. M. Louden
C. W. McCreery
INVENTORS
BY Rule & Hoge
ATTORNEYS Dec. 8, 1942.   H. M. LOUDEN ET AL   2,304,736
MOLD LOCK
Filed April 24, 1941   4 Sheets-Sheet 4
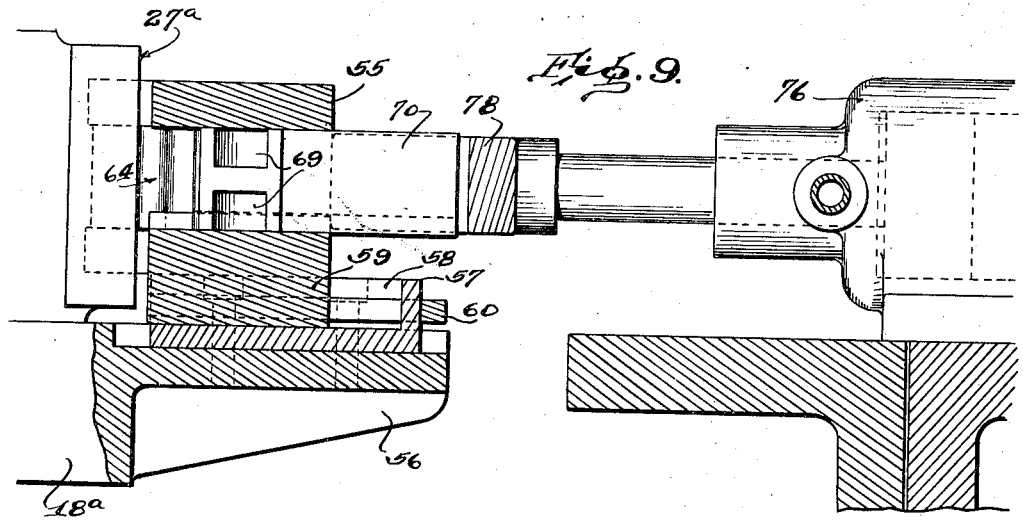
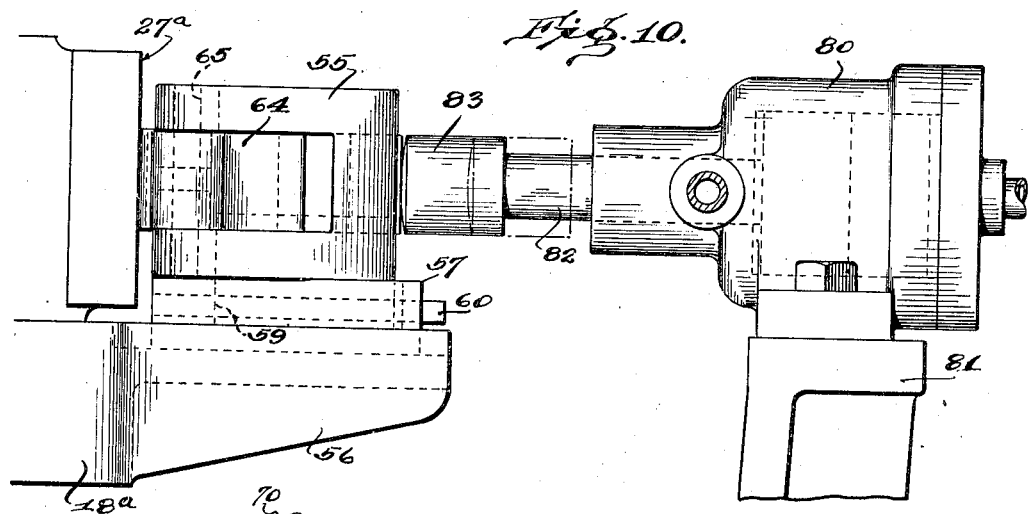
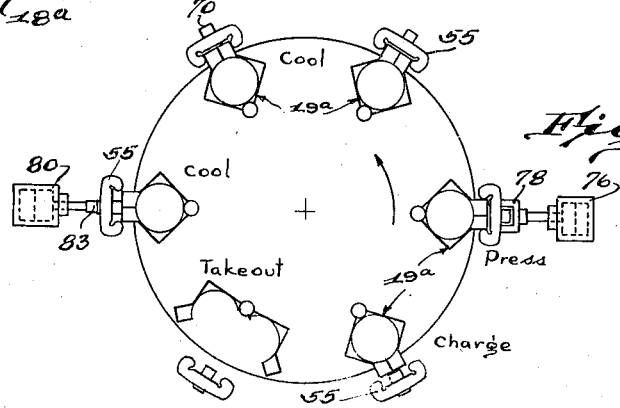
H. M. Louden
C. W. McCreery
INVENTORS
BY Rule & Hoge
ATTORNEYS Patented Dec. 8, 1942

2,304,736

UNITED STATES PATENT OFFICE 2,304,736

MOLD LOCK

Harry M. Louden and Cecil W. McCreery, Muncie, Ind., assignors to Owens-Illinois Glass Company, a corporation of Ohio Application April 24, 1941, Serial No. 390,080

6 Claims. (Cl. 49—14)

The present invention relates to improved mechanism for locking together the halves or sections of press molds of a glassware forming machine during and after the glass pressing operation.

The present invention is associated particularly with a machine for forming hollow glass articles such as a standard glass block forming machine. Forming machines of this type usually include a series of partible molds mounted on a circular table and rotatable about a common vertical axis to bring them in succession in step by step motion, to charging, pressing, cooling, and take-out stations. Various forms of mold locks have heretofore been employed in order to hold the mold halves tightly closed at and in proximity to the pressing station. It has been found in practice that when a relatively heavy mold charge of glass in a semi-plastic state is pressed, the tremendous pressure necessary to transform the charge into a finished or semi-finished article sometimes causes distortion or slight opening of the mold with obviously objectionable results. Normally the mold halves are locked together at least during the pressing of the mold charge, the lock being released at the same time the pressing plunger is withdrawn to permit indexing of the table to the next station. It often happens that the expanded glass within the mold tends to hold the mold halves apart due to the sudden release of the lock immediately after pressing, thereby producing a distorted article.

It is the primary object of our invention to provide a lock individual to each mold which may be closed at the pressing station and positively hold the mold halves together until the take-out station is reached.

Another object of the invention is the provision of simply constructed means which may be readily applied to a suitable mold unit and travel therewith throughout the cycle of operation.

A further object of the invention is the provision of separate means for locking and unlocking the molds at predetermined points during operation of the forming machine.

Other objects and features of novelty will become apparent during the course of the following description.

In the drawings:

Fig. 1 is a plan view of a portion of a standard type of glassware pressing machine illustrating one embodiment of our invention.

Fig. 1A is a plan view diagrammatically illustrating a glassware forming machine embodying our invention.

Fig. 2 is a side elevational view partly in section of the preferred form of our invention shown in operating or locked position.

Fig. 3 is a vertical central longitudinal sectional view showing the mechanism in unlocking position.

Fig. 4 is a horizontal sectional view through a portion of the lock and is taken on line 4—4 of Fig. 2.

Fig. 5 is a transverse sectional view taken on line 5—5 of Fig. 4.

Figs. 6 to 10 inclusive, illustrate a modified form of mold lock; Fig. 6 being a sectional plan view thereof.

Fig. 7 is a horizontal sectional view of the lock in open position.

Fig. 8 is a vertical transverse sectional view taken substantially along line 8—8 of Fig. 6.

Fig. 9 is a vertical longitudinal sectional view of the lock and locking cylinder.

Fig. 10 is a side elevational view of the lock and unlocking cylinder.

Fig. 10A is a plan view diagrammatically illustrating a machine embodying the modified form of our invention.

Referring to Figs. 1 to 5 inclusive of the drawings, the preferred form of our invention is illustrated in connection with a standard glass block pressing machine which includes a mold table 15 mounted for rotation in step by step fashion about a vertical column 16. Mold groups 17 spaced around the table comprise a base plate 18 upon which molds 19 are supported. The molds are formed of complementary sections 20 pivoted together on a vertical hinge pin 21 and adapted to close around a bottom plate 22 carried by the base plate 18. The mold sections 20 are connected by links 23 to a slide 24 which carries a roller 25 for engaging a stationary cam 26 mounted on the column 16. Thus the molds are automatically opened and closed as the table is intermittently rotated by conventional means (not shown). The mold sections 20 are provided adjacent the parting line with bosses 27 or extensions directed radially outward and having vertical parallel opposed outer surfaces 28 which the locking mechanism engages as will become apparent presently.

The locking mechanism comprises a substantially U-shaped frame 30 or clamp, adapted to embrace the bosses 27 and is mounted for sliding movement toward and away from the mold on a pair of horizontal guide rods 31 which are slidably supported in the mold base plate 18. The frame 30 is provided with a pair of depending ears 32 to which the guide rods 31 are secured and by which the frame is supported in proper alignment with the mold. Bolts 33 adjustably carried by the plate also pass through the ears 32 and are adapted to limit the outward movement of the frame 30 when in unlocked position. The degree of in and out movement of the frame may be adjusted to compensate for any differences in alignment should the molds be interchanged. Coil springs 34 on the rods 31 exert an outward pressure on the frame normally tending to move it radially outward beyond its initially unlocked position (Fig. 3) in order to clear the mold and permit the latter to be opened (Fig. 1).

Mold engaging cams 35 (Figs. 4 and 5) are provided at either end of the frame 30 and are arranged to frictionally engage the surface 28 of the extensions 27. Each cam is provided with a cylindrical portion 36 slidable horizontally within a bore 37 formed in the end of the frame. The axis of the bore is disposed at an angle to the radial center line of the mold whereby endwise movement of the cam moves it toward or away from the surface 28. A rod 38 threadedly engaging the cylindrical part of the cam, provides means for adjusting the position of the cam with respect to mold extensions 27 whereby sufficient frictional contact between the cams and mold extensions to retain the lock in position on the mold may be obtained. A set screw 39 is adapted to retain the rod 38 against rotation once the desired setting of the cam is obtained.

The lock is moved into engagement with the mold at the pressing station by an air operated motor 40 (Fig. 1) which is mounted on a stationary bracket 41. Before the pressing plunger (not shown) is lowered to form the charge, a motor piston rod 42 engages the frame 30 to force it into locking position, thereby bringing the cams into engagement with the surfaces 28 of the extensions 27 as shown in Fig. 4. The piston rod is then withdrawn so that the mold table may be indexed. The frame or clamp remains in engagement with the mold extensions until they reach the unlocking station immediately ahead of the take-out station. Means for unlocking the mold and disengaging the frame includes a depending lever 44 (Fig. 3) pivoted for swinging movement on a horizontally disposed pin 45 which is secured to ears 46 on the frame 30. The lower portion 47 of the lever curves outwardly and downwardly and its outer vertical face normally is substantially aligned with the outer vertical surface of the frame 30 or clamp. The point at which the lever curves outwardly from the straight upper portion and which is adjacent the lower edge of the frame, forms a heel 48 adapted to be pressed against the outer face of the mold extensions 27, thereby forcing the frame outwardly and breaking the locking connection with the mold. The lever is provided with an upstanding lug 49 above the pivot which is in constant engagement with a spring pressed plunger 50 within the frame for normally holding it in inoperative position out of engagement with the mold.

An air operated piston motor 51 (Fig. 3) is mounted on a stationary bracket 52 at the unlocking station and is provided with a piston rod 53 adapted to engage the lower end 47 of the lever and force it inwardly to release the lock. The lever 44 when swung inwardly by the rod 53, moves the frame away from the mold, thereby causing the point of contact of the cams 35 to move radially outward beyond the surfaces 28, thus breaking the frictional engagement therebetween. As the piston rod is withdrawn, the springs 34 force the frame outwardly to clear the opening mold sections and the plunger 50 returns the lever to the starting position.

Figs. 6 to 10 inclusive, illustrate a modified form of our invention which embodies generally principles similar to the form previously described. The mechanism comprises a frame 55 mounted for sliding movement toward and away from the mold 19ª and on the radial center line thereof. The support for the frame includes an extension 56 formed on the mold base plate 18ª to which a guide block 57 is adjustably bolted. A channel 58 or guideway, formed in the block is adapted to slidably receive a complementary tongue 59 formed on the frame 55. A U-shaped retaining key 60 engaging in groves 61 and 62 in the block and tongue, respectively, releasably secures the frame within the channel.

A pair of lever locking cams 64 (Figs. 6 and 7) pivoted for limited swinging movement on vertical hinge pins 65 within the frame 55, are formed with nibs 66 adapted when in closed position to frictionally engage the surfaces 28ª of the mold extensions 27ª and thereby prevent premature opening of the mold. Protuberances 67 or fulcrums formed on the lever lie adjacent the outer face of the extensions 27ª as illustrated in Fig. 6 when the unit is in locking position. The protuberances form a fulcrum about which the lever is rocked to release the lock as will be more clearly brought out presently. The end of the lever inwardly from the hinge pin 65 is provided with a bifurcated cylindrical head 68 engaging within slots 69 formed in a lock releasing bar 70 and which is slidably mounted on a tongue 71 or rib, within the frame 55. A projection 73 on the other end of the lever 64 is engageable with an abutment 74 on the frame to limit the swinging movement of the lever in one direction. When in locking position the movement of the bar 70 is limited by a shoulder 75 which bears against the inner face of the frame.

Figs. 6 and 9 illustrate an air operated locking piston motor 76 having a piston rod 77 on which is mounted a forked head 78. The motor is mounted on a stationary bracket at the pressing station. The arms of the fork are adapted to bear against the frame 55 on either side of the bar 70 and as the motor is operated, the frame is moved radially inward toward the mold. The forward movement of the frame causes the engagement of the protuberances 67 with the outer face of the extensions 27ª, thereby causing the levers 64 to swing about the pivot pin 65 and move the nibs 66 toward the surfaces 28ª and at the same time causing the bar 70 to slide outwardly within the frame. The point of contact of the nibs with the surfaces 28ª slips beyond the center line of the pivot pins, thus producing a toggle action for positively holding the molds closed.

The lock is released by means of an air operated motor 80 (Fig. 10) mounted on a stationary bracket 81 at a point immediately preceding the take-out station. The motor is provided with a piston rod 82 having a head 83 thereon disposed in alignment with the bar 70. Upon operation of the motor, the head 83 engages the release bar 70 and moves it inwardly of the frame 55. Such movement transmits swinging motion to the lever about the fulcrums 67 and causes the frame to move outwardly away from the mold.

Modifications may be resorted to within the spirit and scope of the appended claims.

We claim:

1. In combination, a glassware forming machine comprising a table mounted for intermittent rotation about a vertical axis, a plurality of partible press molds carried by said table and adapted to be brought thereby in succession to charging, pressing, cooling and take-out stations, said molds each including complementary sections hinged together, extensions on the free end of the sections having opposed parallel faces adjacent the parting line thereof, a base plate supporting each mold, and a mold lock individual to each mold carried by said plate and yieldably mounted for in and out movement toward and away from said mold, said locking comprising a substantially U-shaped frame adapted to embrace said extensions, cams carried within the ends of said frame for operatively engaging said opposed faces, means for moving the frame to interengage said cams and faces, independent means for reversing the direction of movement of the frame including a depending outwardly and downwardly curved lever pivoted to the inner side of the frame and normally lying in close proximity to the outer face of the mold extension, and means for moving the lever inwardly against the extension to thereby effect reverse movement of said frame and separation of said cams and faces.

2. In combination, a glassware forming machine comprising a table mounted for intermittent rotation about a vertical axis, a plurality of partible press molds carried by said table and adapted to be brought thereby in succession to charging, pressing, cooling and take-out stations, said molds each including complementary sections hinged together, extensions on the free end of the sections having opposed parallel faces adjacent the parting line thereof, a base plate supporting each mold, and a mold lock individual to each mold carried by said plate and yieldably mounted for in and out movement toward and away from said mold, said lock comprising a substantially U-shaped frame adapted to embrace said extensions, the ends of said frame having a pair of horizontal bores therein, a cam supporting rod in each bore, an inwardly projecting cam threaded upon each support, means for adjusting said cams lengthwise of their supporting rods to insure frictional engagement thereof with said opposed faces at times, means for moving said cams and faces into and out of engagement with each other including a piston motor and push-rod and a depending outwardly and downwardly curved lever pivoted within the frame and normally lying in close proximity to the outer face of the mold extension, and an air motor for moving said lever into engagement with the extension to thereby separate said cams and faces.

3. Mold locking mechanism comprising a horizontal frame, a pair of horizontally spaced jaws movably supported upon said frame, means for moving the frame to effect operative engagement between said jaws and the mold, and means for moving the frame to effect disengagement of the jaws and mold, said last named means including a piston type air motor, a push-rod actuated thereby and a lever pivoted to said frame and projecting downwardly into the path of said rod, said lever having a portion adapted for engagement with the mold and operable with projection of the push-rod to separate the mold and said frame.

4. In combination, a mold base plate, a partible mold mounted upon said plate and including complementary sections hinged together at one end, a pair of extensions at the other end having jaw engaging faces lying substantially parallel with the mold parting line, means for locking the sections together including a frame mounted for horizontal sliding movement upon the base plate toward and away from said other end of the mold sections, spring means yieldingly holding the frame and mold separated the maximum degree, jaws at opposite ends of the frame, means for moving the frame toward the mold and effecting interengagement of the jaws and said faces and compressing the spring means, and means for separating the jaws and said faces including a lever pivoted to and depending from the frame between the latter and said extensions, and means for moving the lever into contact with said extensions.

5. In combination, a mold base plate, a partible mold mounted upon said plate and including complementary sections hinged together at one end, a pair of extensions at the other end having jaw engaging faces lying substantially parallel with the mold parting line, means for locking the sections together including a frame mounted for horizontal sliding movement upon the base plate toward and away from said other end of the mold sections, spring means yieldingly holding the frame and mold separated the maximum degree, jaws at opposite ends of the frame, means for moving the frame toward the mold and effecting interengagement of the jaws and said faces and compressing the spring means, means for separating the jaws and said faces including a lever pivoted to and depending from the frame between the latter and said extensions, and means for moving the lever into contact with said extensions, said jaws mounted for adjustment horizontally to vary their spaced relationship and manually operable devices for adjusting the jaws.

6. In combination, a mold base plate, a partible mold mounted upon said plate and including complementary sections hinged together at one end, a pair of extensions at the other end having jaw engaging faces lying substantially parallel with the mold parting line, means for locking the sections together including a frame mounted for horizontal sliding movement upon the base plate toward and away from said other end of the mold sections, spring means yieldingly holding the frame and mold separated the maximum degree, jaws at opposite ends of the frame, means for moving the frame toward the mold and effecting interengagement of the jaws and said faces and compressing the spring means, means for separating the jaws and said faces including a lever pivoted to and depending from the frame between the latter and said extensions, and means for moving the lever into contact with said extensions, a horizontal screw supporting and threadedly engaging each jaw and disposed at an angle to the direction of movement of the frame, and means whereby rotation of the screws varies the spacing of the jaws.

HARRY M. LOUDEN,
CECIL M. McCREERY.